United States Patent [19]

Radtke

[11] Patent Number: 5,088,840
[45] Date of Patent: Feb. 18, 1992

[54] DASHPOT DAMPER

[75] Inventor: Lee Radtke, Gatlinburg, Tenn.

[73] Assignee: United Technologies Corporation, Hartford, Conn.

[21] Appl. No.: 560,985

[22] Filed: Jul. 26, 1990

[51] Int. Cl.⁵ ............................................. F16C 27/00
[52] U.S. Cl. ...................................... 384/535; 384/99
[58] Field of Search ........................ 384/99, 535, 581

[56] References Cited

U.S. PATENT DOCUMENTS

| | | | |
|---|---|---|---|
| 2,729,518 | 1/1956 | O'Connor | 384/99 |
| 2,967,739 | 1/1961 | Hoffmann | 384/535 X |
| 4,084,861 | 4/1978 | Greenberg et al. | 384/99 |
| 4,213,661 | 7/1980 | Marmol | 384/99 |
| 4,214,796 | 7/1980 | Monzel et al. | 384/581 X |
| 4,971,457 | 11/1990 | Carlson | 384/99 |

FOREIGN PATENT DOCUMENTS 1318742  6/1987  U.S.S.R. ........................... 384/535

Primary Examiner—Thomas R. Hannon
Attorney, Agent, or Firm—Norman Friedland

[57] ABSTRACT

A damper system for supporting a bearing for a rotating shaft of a gas turbine engine includes a plurality of circumferentially spaced dashpot dampers including either a piston or bellows juxtaposed between the bearing housing and the bearing support spring.

5 Claims, 3 Drawing Sheets

DASHPOT DAMPER

DESCRIPTION

CROSS REFERENCE

The subject matter of this application is related to the subject matter of commonly assigned U.S. patent application Ser. No. 07/560,984 filed on July 26, 1990 and entitled "Spring Supported Damping System", now U.S. Pat. No. 5,044,781.

TECHNICAL FIELD

This invention relates to fluid dampers for bearings supporting the shaft of rotating machinery and particularly to a dashpot damper and spring supporting the bearing of the rotor shaft of a gas turbine engine.

While squeeze film dampers and curve beam dampers have proven to be efficacious in certain gas turbine engine applications, because of the requirements necessary to satisfy the advanced engine technology these heretofore dampers have their shortcomings.

The structure disclosed and claimed in U.S. Pat. No. 4,213,661 entitled "Bearing Support Structure Combining Fluid Damping and Spring Damping Apparatus" granted to R. A. Marmol on July 22, 1980 and assigned to United Technologies Corporation, the assignee common to this patent application exemplifies a state of the art curved beam damper. The curved beam damper consists of a plurality of arcuate shaped segments that are circumferentially disposed end-to-end to form a ring that surrounds the outer race of the bearing. Oil is fed into a cavity located under the outer diameter face of the curved beam for damping the vibratory energy generated by the rotating shaft supported by the bearing. Some of the shortcomings of this structure are, for example:

1. The thrust load imposed on the bearing is resisted by the arcuate shaped segment. This essentially presents an indirect path for the thrust load which has a tendency to roll the segments inside out about its transverse axis.

2. These dampers are difficult to seal and that the leakage of oil from the damper cavity impairs the damping effectiveness. This is true for both radial and thrust bearing applications.

3. In thrust bearing applications, the beam deflection causes scuffing at thrust contact points impacting the wear of the components and hence, adding to the leakage problem.

4. Because the outer diameter of the bearing is relatively small, the number of arcuate segments that are used are limited and each segment must be sufficiently large to attain the proper spring rate, so that the bearing outer race will feel large loadings at separate points on each segment. This necessitates a thicker support member to accommodate these loadings.

The structure disclosed in U.S. Pat. No. 4,084,861, entitled "Thrust Bearing Damping Means" and granted to P. G. Greenberg and S. D. Patterson on Apr. 18, 1978, commonly assigned to United Technologies Corporation exemplifies a state-of-the-art squeeze film damper.

The conventional squeeze film damper that employs either the full annular cavity like the damper exemplified in U.S. Pat. No. 4,084,861, supra, or the circumferentially spaced race track type sealed cavities is susceptible to leakage which obviously impacts the damping effectiveness.

I have found that I can obviate the problems enumerated above and provide an improved damper by discretely locating a plurality of dashpot dampers circumferentially spaced about the bearing and including a spring supporting the bearing which is disposed between the outer race of the bearing and the dashpot damper. It is contemplated within the scope of this invention that the dashpot would employ either a piston or a bellows.

SUMMARY OF THE INVENTION

An object of this invention is to provide improved damping means for the bearing supporting the shaft in rotating machinery.

A feature of this invention is to utilize a plurality of dashpots judiciously disposed about the circumference of the bearing between the bearing support housing and the bearing outer race.

A still further feature of this invention is the improved dashpot damper that utilizes a squirrel cage spring supported at one end to the bearing support housing for supporting the thrust or radial bearing of a gas turbine engine.

A still further feature of this invention is to utilize a bellows for each dashpot damper that has one end attached to the squirrel cage spring and the other end attached to the bearing support housing.

A still further object of this invention is to utilize pistons supported in cylinders formed in the bearing cover support housing and having one end bearing against the squirrel cage spring for forcing fluid out of said cylinder in response to relocation energy transmitted from the rotor shaft for dissipating this energy. Valves at the inlet and outlet of said cylinder prevent fluid back flow and select the pressure level of the fluid in said cylinder.

Although this invention has been shown and described with respect to detailed embodiments thereof, it will be understood by those skilled in the art that various changes in form and detail thereof may be made without departing from the spirit and scope of the claimed invention.

BEST MODE FOR CARRYING OUT THE INVENTION

While the invention being described is utilized with a thrust ball bearing, it will be appreciated by one skilled in the art that the invention may be equally employed with a roller and other bearing applications. It should also be understood that while the invention is intended for use on an aircraft gas turbine engine, it also can be employed on other rotating machinery installations where the dissipation of high vibrating energy is required.

Figure 1:
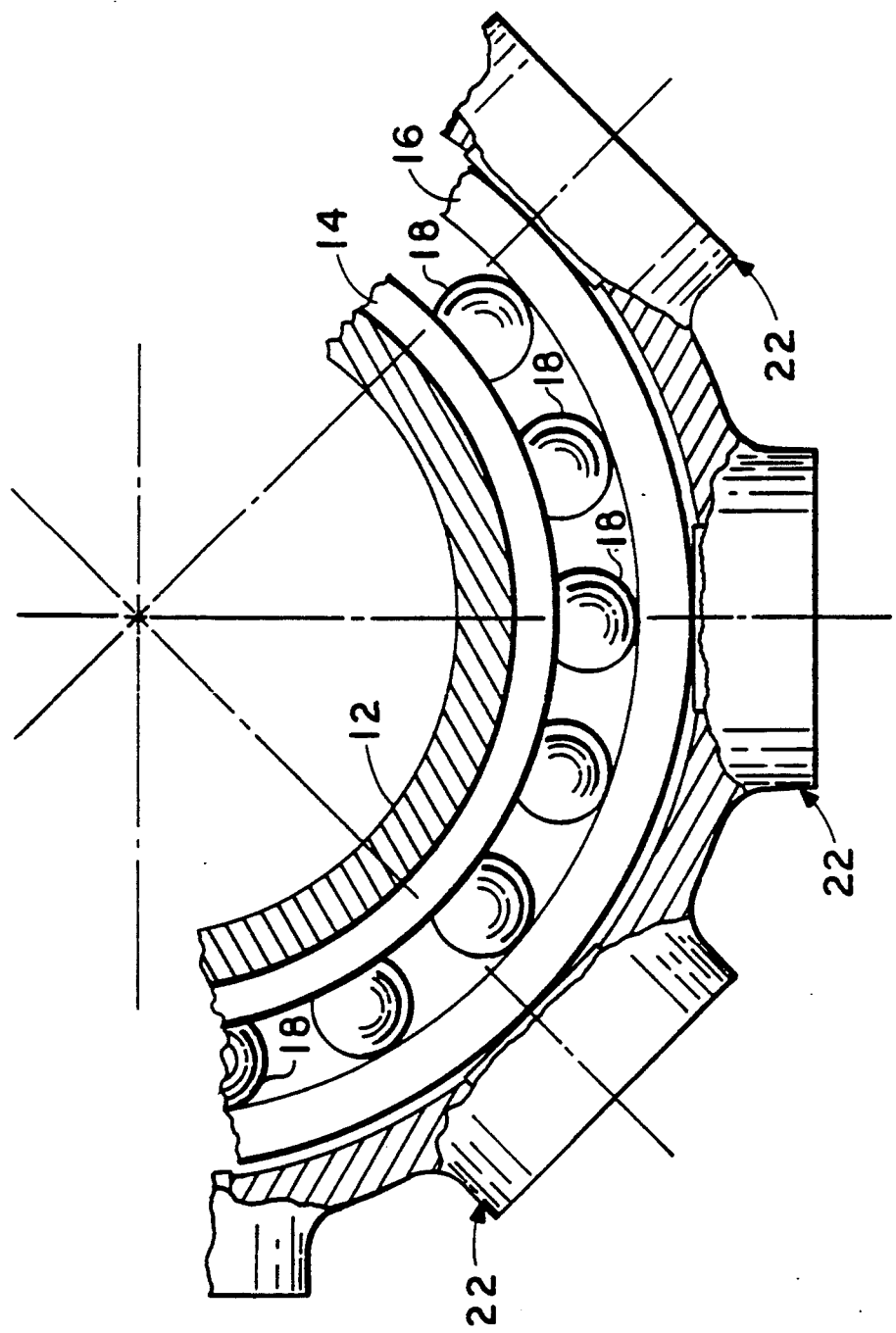
FIG. 1 is a schematic view showing the arrangement of the dashpot dampers relative to a thrust ball bearing.
Figure 2:
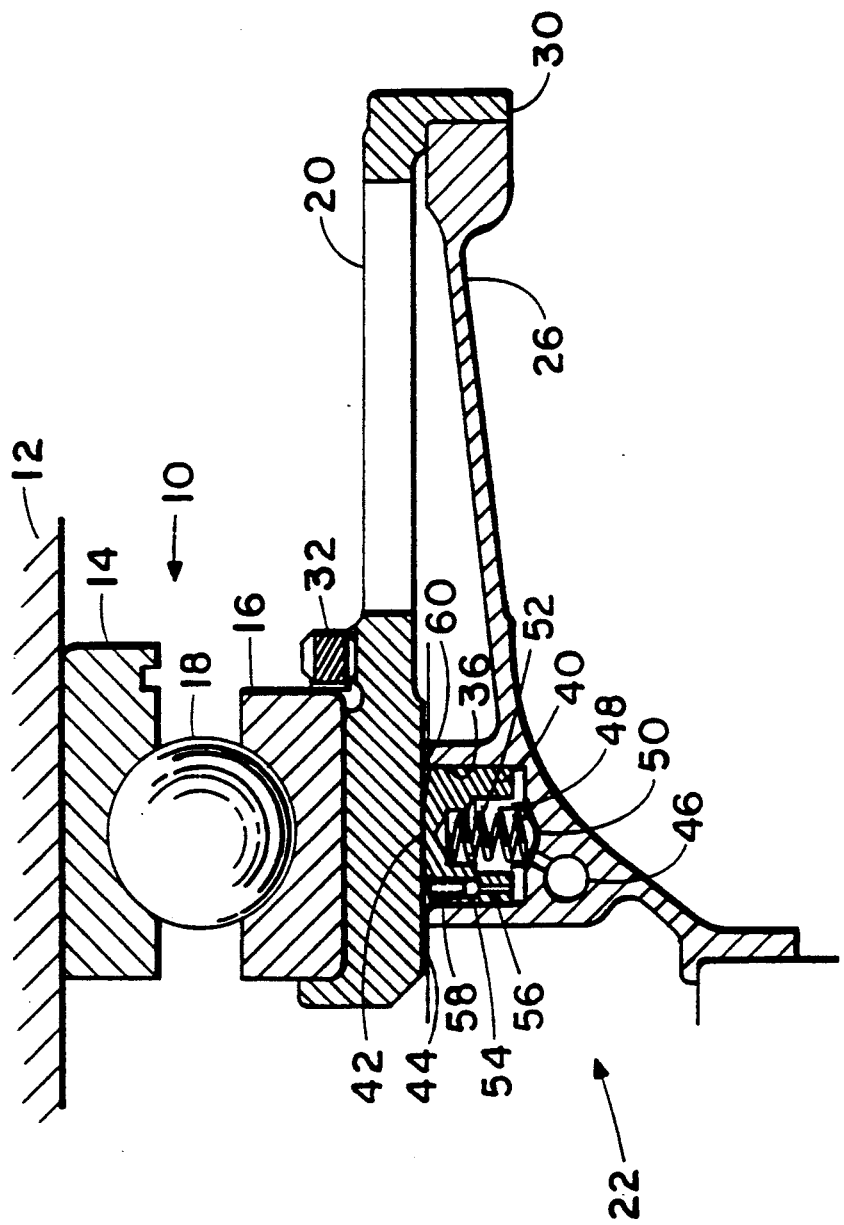
FIG. 2 is a sectional view showing the details of one of the plurality of dashpot dampers.

In the preferred embodiment as shown in FIGS. 1 and 2, the invention is utilized on a thrust ball bearing generally illustrated by reference numeral 10 for supporting the rotor shaft 12. The bearing is any suitable conventional ball bearing consisting of inner race 14, outer race 16 and a plurality of circumferentially disposed spherical balls 18 sandwiched therebetween. The bearing 10 is supported to both the squirrel cage spring 20 and the damper generally illustrated by reference numeral 22. A suitable squirrel cage spring is disclosed in U.S. Pat. No. 4,084,861, supra, which is incorporated herein by reference.

The damper 22 and spring 20 are supported to the bearing housing 26, only partially shown, which in turn is ultimately supported to the engine case. The flange 30 formed on one end of squirrel cage spring 20 is supported to the housing 26 and the end remote bears against the outer diameter of outer race 16. The bearing assembly may be held in place by any suitable means such as by the retaining nut 32 as shown.

A plurality of dashpot dampers 22 (only one being shown in detail) are supported in bores 36 formed in housing 26 and are judiciously located around the bearing 10 at circumferentially equally spaced intervals. The number of dashpot dampers will depend on the particular requirements of each application and the spacing between dampers will be predicated by the requirement of each application.

The dashpot damper includes a piston 40 having one end 42 bearing against the outer diameter surface 44 of spring 20 and the opposite end being subjected to pressurized fluid. Fluid from the annular manifold 46 which is continuously fed pressurized fluid from a pressure source feeds cavity 48 formed within the central portion of piston 40.

Valve 50 urged closed by spring 52 (see FIG. 2) at the inlet prevents the back flow of fluid in cavity 48 and continuously admits fluid at the prescribed pressure. Valve 54 in the outlet passage 56 urged closed by spring 58 serves to relieve fluid at predetermined pressure/flow levels from cavity 48 when the piston is displaced to reduce the volume in cavity 48. The pressurized fluid forced out of cavity 48 flowing through the outlet valve 54 leaks between the gap formed between the inner diameter end 60 of bearing housing 26 and the spring 20 returning to pump. The gap defined by these two surfaces, i.e. housing 26 and spring 20 defines the amount of travel the piston 40 is allotted. Essentially, this dimension is the stop for grounding out the fluid damper.

Figure 3:
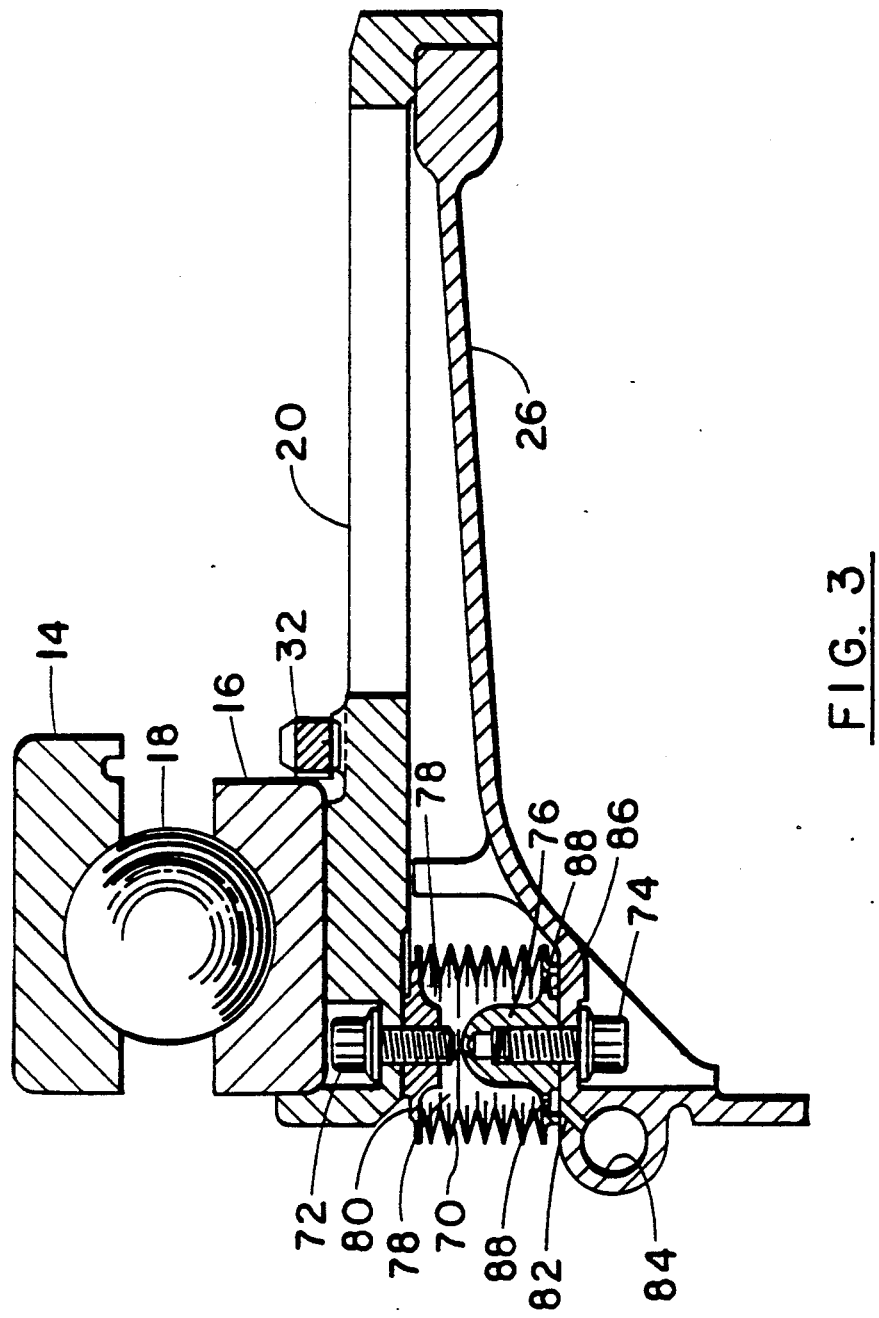
FIG. 3 exemplifies another embodiment of the dashpot damper employing bellows instead of pistons.

The embodiment exemplified in FIG. 3 utilizes a bellows 70 instead of the piston. In this structure the spring 20 is rigidly connected to one end of bellows by the bolt 72 and the bearing housing is connected to the other end of bellows 70 by the bolt 74. (Like reference numerals refer to like parts in all the Figs.)

The bellows may have an enclosure 76 providing a fluid tight bellows chamber 78 on either end or solely on one end, as shown. The bolt extending through the aperture in spring 20 is threadably attached to the end enclosure 80 of bellows 70. This embodiment may not require check valves inasmuch as the action of the vibrating shaft will cause the bellows to extend as well as compress. Obviously, the bellows will have an equal and opposite displacement since each bellow is rigidly connected to the housing and spring 20.

Fluid is admitted to the bellows through passage 82 that communicates with the annular manifold 84 formed in housing 26 and the annular well 86 circumscribing the bellows axis and drill hole 88 formed in the bellows end enclosure 76.

When one of the bellows 70 is compressed the fluid internally thereof will be squeezed out and will return to the manifold 84 where it will be distributed to the bellows 70 that is diametrically opposed, which as a consequence of the vibratory action will be caused to expand. Since the expansion and contraction of the bellows 70 surrounding the bearings are equal and opposite the fluid may be retained in the system and only minimum fluid may be required from the pressurized source. If the heat rejection rate is at a value that a continous flow of fluid in and out of the system is required, it will be obvious to one skilled in the art that the bellows closed loop system can be designed to incorporate the open loop system as disclosed in FIGS. 1 and 2.

Although this invention has been shown and described with respect to detailed embodiments thereof, it will be understood by those skilled in the art that various changes in form and detail thereof may be made without departing from the spirit and scope of the claimed invention.

I claim:

1. For a bearing rotatably supporting a shaft having an outer race, a bearing support housing including an annular surface concentrically mounted relative to said outer race, spring means having one end supported to said bearing support housing, a plurality of dashpot dampers circumferentially spaced around said outer race disposed in cylinders formed in said bearing support housing and including a piston having one end bearing against said spring and the other end defining with said cylinder a cavity for receiving pressurized fluid, an inlet passageway for admitting pressurized fluid into said cylinder and an outlet passageway for discharging fluid from said cylinder whereby vibratory energy exited from said shaft is transferred to said cylinder through said piston to flow fluid into and out of said cylinder to dissipate said vibratory energy.

2. For a bearing as claimed in claim 1 including a pressure relief valve in said inlet passageway for preventing fluid to return from said cylinder into said inlet passageway.

3. For a bearing as claimed in claim 2 including a pressure relief valve in said outlet passageway for preventing pressurized fluid from discharging from said cylinder below a predetermined pressure.

4. For a bearing rotatably supporting a shaft as claimed in claim 3 wherein said spring is a squirrel cage spring.

5. For a gas turbine engine including a rotating rotor shaft and a bearing support housing, bearing means supported in said bearing support housing for supporting said rotor shaft, said bearing means including an outer race, spring means supported to said bearing support housing for supporting said bearing means, in combination with fluid damper means, said fluid damper means including a plurality of dashpot dampers disposed circumferentially around said outer race, said dashpot dampers being equally spaced and means for supplying pressurized fluid into said dashpot dampers, said dashpot dampers cooperating with said outer race and said bearing support housing, said dashpot damper having a piston mounted in a cylindrical bore formed in said bearing support housing, said spring means include a squirrel cage spring having one end connected to said bearing support housing and the other end being disposed between said outer race and said piston whereby pressurized fluid is squeezed out of said dashpot dampers in response to vibratory energy transmitted from said rotor shaft.

* * * * *

UNITED STATES PATENT AND TRADEMARK OFFICE
CERTIFICATE OF CORRECTION

PATENT NO. : 5,088,840

DATED : February 18, 1992

INVENTOR(S) : Lee Radtke

It is certified that error appears in the above-identified patent and that said Letters Patent is hereby corrected as shown below:

Col. 1, line 59, "4,084,86I" should read --4,084,861--.
Col. 3, line 20, "!0" should read --10--.
Col. 3, line 36, "pressure/-" should read --pressure/--.

Signed and Sealed this

Twenty-fifth Day of May, 1993

Attest:

MICHAEL K. KIRK

Attesting Officer

Acting Commissioner of Patents and Trademarks